United States Patent
Lee et al.

(10) Patent No.: US 10,248,583 B2
(45) Date of Patent: Apr. 2, 2019

(54) SIMULTANEOUS VIDEO AND BUS PROTOCOLS OVER SINGLE CABLE

(71) Applicant: TEXAS INSTRUMENTS INCORPORATED, Dallas, TX (US)

(72) Inventors: Yoon J. Lee, Allen, TX (US); Brian H. Quach, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 494 days.

(21) Appl. No.: 14/835,333

(22) Filed: Aug. 25, 2015

(65) Prior Publication Data

US 2016/0062924 A1 Mar. 3, 2016

Related U.S. Application Data

(60) Provisional application No. 62/041,993, filed on Aug. 26, 2014.

(51) Int. Cl.
*G06F 1/16* (2006.01)
*G06F 13/10* (2006.01)
(Continued)

(52) U.S. Cl.
CPC .............. *G06F 13/102* (2013.01); *G06F 1/16* (2013.01); *G06F 13/362* (2013.01);
(Continued)

(58) Field of Classification Search
CPC .. G06F 13/4282; G06F 13/362; G06F 13/102; G06F 13/4068; G06F 13/409; G06F 1/16
(Continued)

(56) References Cited

U.S. PATENT DOCUMENTS

| 8,799,537 B1* | 8/2014 | Zhu | G06F 13/385 |
| | | | 710/14 |
| 2010/0104029 A1* | 4/2010 | Lee | H04B 3/50 |
| | | | 375/257 |

(Continued)

OTHER PUBLICATIONS

Texas Instrument DockPort Controller HD3SS2521 Datasheet, May 2013.*

*Primary Examiner* — Tim T Vo
*Assistant Examiner* — Phong H Dang
(74) *Attorney, Agent, or Firm* — John R. Pessetto; Charles A. Brill; Frank D. Cimino (57) ABSTRACT

Method and systems are disclosed for transporting simultaneous video and bus protocols over a single cable. At least some of the illustrative embodiments are systems including a main switch configured to operate in an enhanced mode where the main switch is configured to transfer data from a first data source and a second data source to a cable, operate in a default mode where the main switch is configured to transfer data from the second data source to the cable without transferring data from the first data source; a multipurpose switch configured to operate in a handshake mode where the multipurpose switch transports handshake data between the cable and a digital logic, operate in a data mode where the multipurpose switch transports bus data between the cable and the second data source; and the digital logic programed to enable modes of operation of the multipurpose switch and the main switch.

17 Claims, 4 Drawing Sheets

(51) Int. Cl.
    *G06F 13/40* (2006.01)
    *G06F 13/42* (2006.01)
    *G06F 13/362* (2006.01)

(52) U.S. Cl.
    CPC ........ *G06F 13/409* (2013.01); *G06F 13/4068* (2013.01); *G06F 13/4282* (2013.01)

(58) Field of Classification Search
    USPC .......................................................... 710/14
    See application file for complete search history.

(56) References Cited

U.S. PATENT DOCUMENTS

| | | | | |
|---|---|---|---|---|
| 2011/0087806 | A1* | 4/2011 | Mohanty | G06F 13/385 710/16 |
| 2013/0080665 | A1* | 3/2013 | Park | G06F 13/14 710/60 |
| 2013/0275629 | A1* | 10/2013 | Hall | G06F 13/385 710/14 |
| 2013/0332642 | A1* | 12/2013 | Capezza | G06F 13/4081 710/304 |
| 2014/0297898 | A1* | 10/2014 | Parten | G06F 13/385 710/14 |
| 2016/0147704 | A1* | 5/2016 | Guillerm | G06F 13/4068 710/106 |

\* cited by examiner

SIMULTANEOUS VIDEO AND BUS PROTOCOLS OVER SINGLE CABLE

CROSS-REFERENCE TO RELATED APPLICATIONS

The present application claims priority to U.S. Provisional Patent Application No. 62/041,993, filed Aug. 26, 2014, titled "Multi-Lane USB Peripheral Interconnect Supporting Simultaneous Displayport Video And USB Protocols With Power Capability," which is incorporated by reference herein as if reproduced in full below.

BACKGROUND

Peripheral interconnect solutions with video and data transfer capability often require large proprietary connectors and/or multiple connectors and cables. For instance, a laptop might require separate cables to connect to various peripherals such as an external monitor, an external hard drive, an external mouse, etc. Additionally, a laptop may use a separate cable to connect to a power outlet.

In order to reduce the number of cables used to connect a laptop to various peripherals, various systems may implement complicated aggregators or controllers to enable the use of a single cable that transports multiple protocols. These systems may also implement modifications to standard circuitry within various peripherals to enable the use of one cable to connect various peripherals to a laptop.

BRIEF DESCRIPTION OF THE DRAWINGS

For a detailed description of various examples, reference will now be made to the accompanying drawings in which.

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

The requirement for large connectors and/or multiple connectors and cables can be cost prohibitive. Additionally, as computing devices are getting smaller and thinner, the ability to use one cable to connect to all the different available peripherals is beneficial. Thus, any advancement that helps to reduce the number of cables needed to transfer data between various peripherals may be beneficial.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be an example of the embodiment, and not intended to intimate that the scope of the disclosure, including the claims, is limited to that embodiment.

Various embodiments are directed to implementing a system that is able to simultaneously communicate using different protocols over a single cable. In particular, the system may comprise a computing device connected to a dock by a single cable that is capable of transferring both video and data. Additionally, the system may be able to receive or deliver power through the single cable. In lieu of utilizing complicated and expensive aggregators and controllers, in various embodiments, the above described capabilities may be implemented using a main switch and a multipurpose switch, both of which are controlled by a digital logic circuit (hereinafter "digital logic"). After performing a discovery handshake through the multipurpose switch, the digital logic may configure the main switch for simultaneous bus data and display data transfer and optionally enable power delivery.

Figure 1:
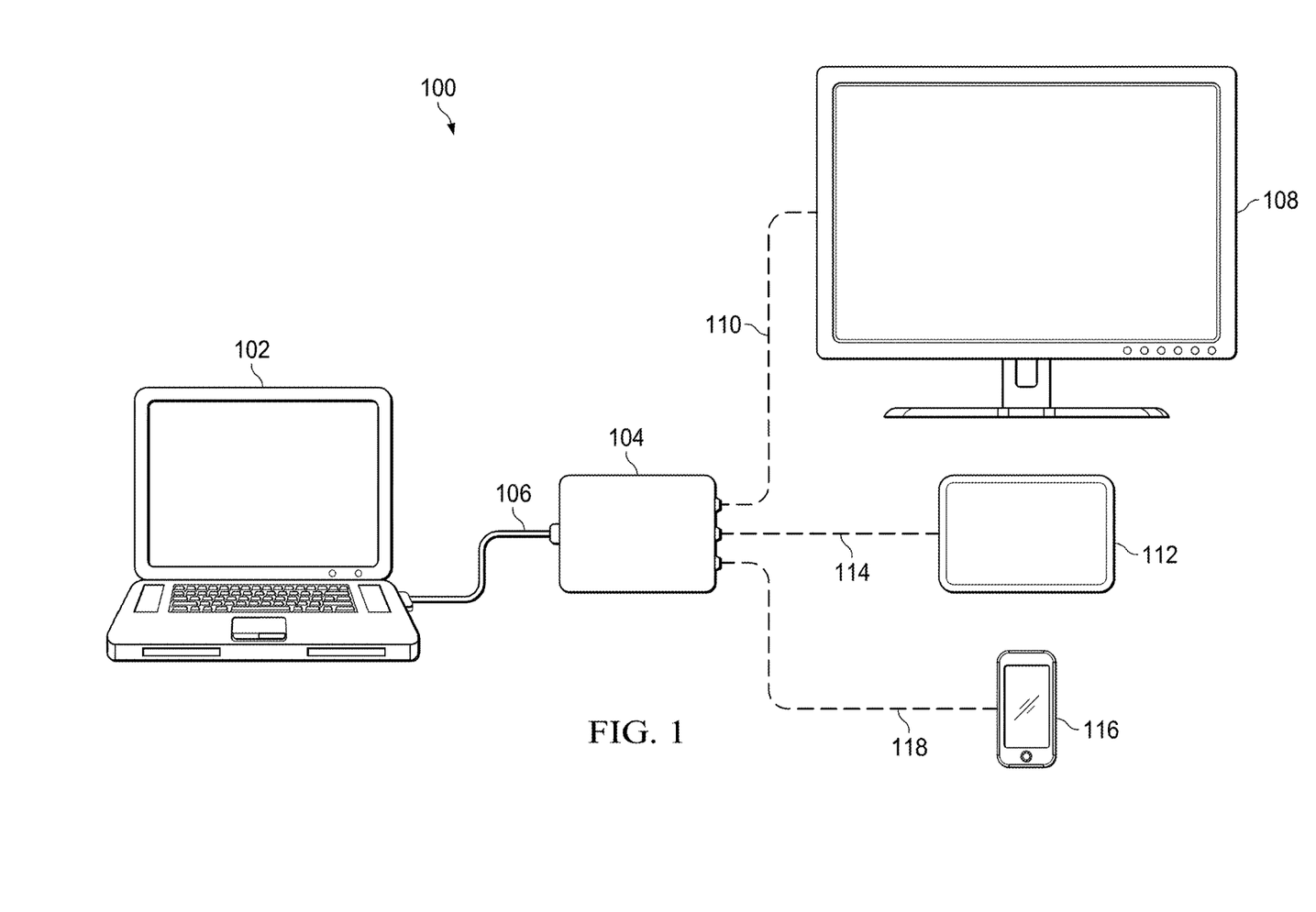
FIG. 1 shows a computing environment utilizing a communication technology in accordance with at least some embodiments.

FIG. 1 shows an environment 100 in which a laptop 102 may connect to a dock 104 through cable 106. Laptop 102 may be any computing device capable of generating or receiving display data as well as bus data. For example, other computing devices may include a desktop computer, a gaming system, television, tablet computer, or any other device.

Dock 104 may be any device capable of transmitting various data to the laptop 102. In various embodiments, dock 104 may include a docking station, port replicator or any other device that provides a simplified way of coupling laptop 102 to various peripherals. In various embodiments, dock 104 may be a monitor with universal serial bus (USB) ports or other data ports on the monitor. As depicted in FIG. 1, dock 104 may be connected by peripheral cable 110 to external monitor 108. Dock 104 may also be connected to an external drive 112 through peripheral cable 114, and a phone 116 through peripheral cable 118.

In various embodiments, peripheral cables 110, 114, and 118 may be equipped to communicate using various protocols based on the device connected to dock 104. For example, cable 110 may be equipped with a display interface such as DisplayPort interface, High-Definition Multimedia Interface (HDMI), Digital Visual Interface (DVI) protocol, or Video Graphics Array (VGA) interface, or any other display interface used to render a display on a computer monitor. Similarly peripheral cables 114 and 118 may be equipped to communicate using various bus protocols used by external drive 112 and/or phone 116. In various embodiments peripheral cables 114 and 118 may comprise USB interfaces. The protocols of two or more the peripheral cables may be the same or different.

Dock 104 may contain the capability of coupling these peripherals 108, 112, and 116 to laptop 102 through a single cable 106. As depicted cable 106 may have the capability to transfer different types of protocols associated with display and bus data to laptop 102.

In addition, cable 106 may have the capability to deliver power to laptop 102 from dock 104. Alternatively, cable 106 may deliver power from laptop 102 to dock 104. The ability to use a single physical connection such as cable 106 to transport various data as well as power between laptop 102 and dock 104 greatly reduces the number of cables that may be used otherwise. For example, without the use of cable 106, large proprietary connectors and/or multiple connectors and cables would be used to connect dock 104 to laptop 102. Additionally, as computing systems become thinner, less space is available to connect multiple devices with different cables. Thus implementing a cable that is capable of transporting more than one protocol as well as power may be beneficial. In various embodiments, cable 106 may comprise a connector such as USB 3.1 type C.

In order to implement interfaces and connectors with the capability to transport, for example, both USB data and DisplayPort data, various technologies such as THUNDERBOLT may utilize a complicated aggregator/controller with higher cost. However, for various reasons, reducing costs and eliminating the need for a complicated aggregator/controller may be desirable. Accordingly, in various embodiments of the present disclosure discussed with respect to FIGS. 1-5, solutions that do not use an expensive and complicated aggregator/controller are discussed. Thus components included in laptop 102 or dock 104 may implement the capability to transport both USB and DisplayPort data in a manner that preserves existing protocols, while eliminating the use of an expensive, complicated aggregator.

In various embodiments, the components included in laptop 102 or dock 104 may be programmed to detect the capabilities of a device connected to laptop 102. For example, dock 104 may be able to transport both display data as well as USB data across cable 106. Laptop 102 may detect this capability through components discussed further below and enable a mode of operation of the cable 106 such that both USB and display data is transported through cable 106. In some embodiments, the components may be programmed to transfer only USB data over cable 106 in a USB mode in the event that display capability of a device connected to laptop 102 is not detected. For instance, if cable 106 couples a mouse to laptop 102, laptop 102 may operate the components in USB mode only such that only USB data is transported over cable 106. In other instances, dock 104 may couple the mouse to laptop 102. In some embodiments, the components in laptop 102 or dock 104 may also be able to detect whether power may be transferred between laptop 102 and dock 104 through cable 106. Accordingly, the components in laptop 102 or dock 104 may determine a direction of power transfer as well as an amount of power to be transferred.

Figure 2:
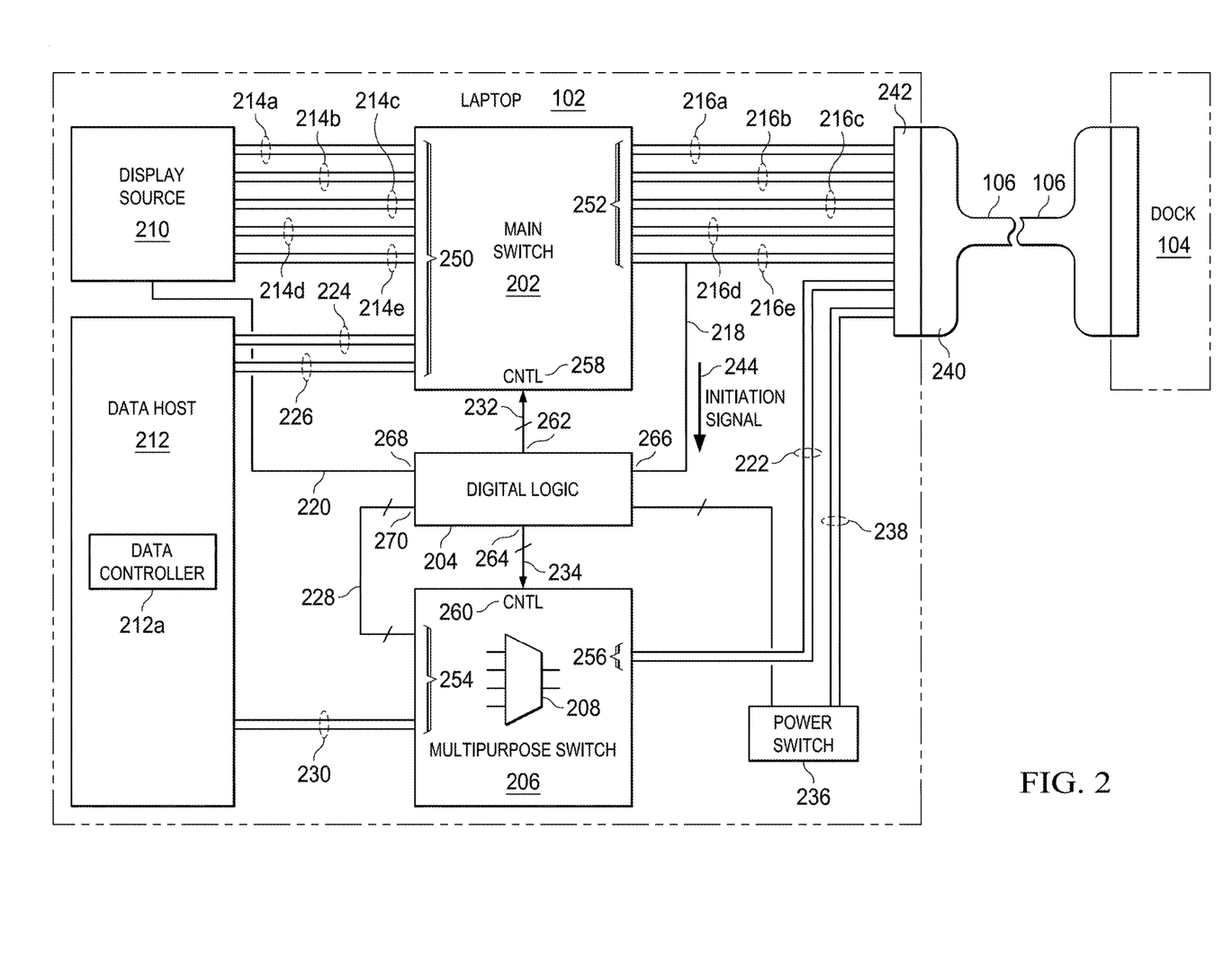
FIG. 2 shows, in block diagram form, various components located within the computing environment in accordance with various examples.

Turning now to FIG. 2, in accordance with example systems, various components located within laptop 102 are shown in block diagram form. As depicted, cable 106 is coupled to laptop 102 through connector 240 coupled to laptop port 242. As discussed in FIG. 1, cable 106 couples laptop 102 to dock 104. Port 242 is coupled to various components 202, 204, 206, and 236 through depicted data lines 216a-e, 218, 222, and 238. In various embodiments, a data line, such as data line 216a may comprise a single data line or a pair of data lines used to communicate data traffic in either direction (hereinafter "data line"). In several embodiments, data lines 214a-e, 216a-e, 218, 220, 222, 224, 226, 228, 230, and 232 may comprise any physical connection that provides pathways for transferring information within devices, components, or units that may be present in laptop 102.

Accordingly, in some embodiments, data lines 214a-e, 216a-e, 218, 220, 222, 224, 226, 228, 230, and 232 may be part of a fabric that includes one or more buses, controllers, interconnects, and/or bridges. In various embodiments, data lines 214a-e, 216a-e, 218, 220, 222, 224, 226, 228, 230, and 232 may comprise traces on a motherboard or other circuit board, where the traces electrically connect electrical components such as connector 240 to various components within laptop 102. In some embodiments, data lines 214a-e, 216a-e, 218, 220, 222, 224, 226, 228, 230, and 232 may implement different communication protocols based on a configuration of cable 106.

Still referring to FIG. 2, main switch 202 is a component comprising at least one multiplexer that couples at least data lines 216a-e to data lines 214a-e, 224, and 226 to ensure proper delivery of data exchanged between cable 106 and components 210 and 212. In various embodiments, main switch 202 may comprise a set of switch connections 250 coupled to data lines 214a-e, 224, and 226. As defined previously, in relation to main switch 202, a switch connection is an electrical connection to the switch. Thus, a subset of the set of switch connections 250 of main switch 202 is coupled to display source 210 (i.e., through data lines 214a-e) and a different subset of the set of switch connections 250 is coupled to the data host 212 (i.e., through data lines 224 and 226). The term switch connection does not imply a direction of data flow, and thus data may flow into or out of the electrical connection to the switch. Similarly, the term "source does not imply a direction of data flow, and thus a source may generate outbound data flow as well as receive inbound data flow.

Additionally, main switch 202 may comprise a set of switch connections 252 coupled to data lines 216a-e. The set of switch connections 252 of the main switch 202 may be coupled to the cable 106 though data lines 216a-e. In various embodiments, depending on a mode of operation of the main switch 202, main switch 202 may couple different subsets of the set of switch connections 250 to different subsets of the set of switch connections 252.

In one example, cable 106 may transport DisplayPort data along with USB data corresponding to any of the USB standards, such as USB 1.0, USB 2.0, USB 3.0, USB 3.1, etc. In various embodiments, display source 210 may comprise a graphics card, graphics processor, processor, etc. that may generate a feed of output images to a display, such as a computer monitor. In several embodiments, data host 212 may comprise a bus or data controller 212a. In some implementations, data host 212 comprises a USB host controller, which may in turn be coupled to a processor and memory.

Continuing the example of an embodiment in which cable 106 transports DisplayPort data and USB data, depending on the particular USB standard transported, different data lines 216a-e, and 222 may be used. For example, data corresponding to higher speed standards such as USB 3.0 and USB 3.1 may be transported along data lines 216a-e. Data corresponding to slower speed standards such as USB 2.0 may be transported along data line 222.

In one example in which a higher speed USB standard is used, cable 106 may transport DisplayPort data through two data lines 216a and 216b, and USB data through two other data lines 216c and 216d. Thus a first subset of the set of switch connections 252 of the main switch 202 may transport DisplayPort data and a second subset of the set of switch connections 252 of the main switch 202 may transport USB data. To transport USB data properly between data host 212 and cable 106, main switch 202 may couple the second subset of the set of switch connections 252 of the main switch 202 to the appropriate subset of the set of switch connections 250 (e.g., switch connections coupled to data lines 224 and 226).

For example, where USB data is transported through data lines 216c and 216d, the main switch 202 may be configured to couple data lines 216c and 216d to data lines 224 and 226, such that the USB data is correctly transported between cable 106 and data host 212. Additionally, main switch 202 may be configured to couple data lines 216a and 216b to two of the data lines 214a-e such that DisplayPort data is correctly transported between display source 210 and cable 106.

In situations where a slower speed USB standard is used, data line 222 may be used to transport the slower USB data while four data lines of data lines 216a-e may be used to transport DisplayPort data. Accordingly cable 106 may be configured such that data lines 216a-e may be used to transport USB data only with no data lines allocated for the transportation of DisplayPort data. Main switch 202 may be configured to couple all or a subset of data lines 216a-e used to transport DisplayPort data to all or a subset of data lines 214a-e. Additionally, in situations where a slower speed USB standard is used, a multipurpose switch 206 may be configured to couple data line 222 to data line 230.

Similar to the switch connections of the main switch 202, multipurpose switch 206 may comprise sets of switch connections 254 and 256. As depicted in FIG. 2, in one embodiment, a first portion of the set of switch connections 254 of the multipurpose switch 206 may be coupled to the digital logic 204 through data line 228. A second portion of the set of switch connections 254 may be coupled to the data host 212 through data line 230. The set of switch connections 256 of multipurpose switch 206 may be coupled to the cable 106 through data line 222. Based on a mode of operation of the multipurpose switch 206, discussed more below, multipurpose switch 206 may couple the set of switch connections 256 to either the first portion or the second portion of the set of switch connections 254.

Accordingly, main switch 202 and multipurpose switch 206 may be configured by digital logic 204, to operate in a mode that is compatible with the type of data that is allocated to each of the data lines 216a-e, and 222 such that data transported from or to display source 210 or data host 212 are coupled with the appropriate data lines 216a-e and 222 coupling the cable 106.

In various embodiments, digital logic 204 may comprise a reconfigurable system or device that may be updated or programmed by programming code. Digital logic 204 may comprise circuit connections 266, 268, and 270 and control ports 262 and 264. As defined previously, in relation to the digital logic, a circuit connection is an electrical connection to the digital logic, which data may flow in and out of. Additionally, in relation to the digital logic, a control port is an electrical connection to the digital logic out which a control signal may be transported. The electrical state of the switch control may control the electrical couplings of switch connections within a switch.

Main switch 202 may be coupled to digital logic 204 through one or more control lines 232 through which the digital logic 204 may select a mode of operation of the main switch 202. As depicted, control lines 232 may couple a control port 262 of digital logic 204 to a switch control 258 of main switch 202. An electrical state of switch control 258 may control the electrical coupling of the first set of switch connections 250 and the second set of switch connections 252.

In several embodiments, the digital logic 204 may be programmed to determine a capability of a device connected through cable 106. For example, digital logic 204 may be programmed to detect and determine whether a device is capable of transporting display data, bus data, and power. In various embodiments, digital logic 204 may perform a handshake with a device connected through cable 106 after receiving an initiation signal 244 through circuit connection 266. In various embodiments, the initiation signal 244 may be a signal native to a specific type of protocol. In other embodiments, the initiation signal 244 may serve as an indication to the digital logic 204 that a connected device may be capable of more than simply communicating using one type of protocol.

Continuing the example of cable 106 having the capability to transport both USB and DisplayPort data, digital logic 204 may be programmed to detect a signal that is unique to a specific display protocol. In the case of DisplayPort, the signal may be a Hot Plug Detect (HPD) signal that may be provided by a display sink such as a monitor.

As depicted in FIG. 2, initiation signal 244 such as an HPD signal may be transported along a data line 216e and through data line 218 which is coupled to digital logic 204. Thus circuit connection 266 of digital logic 204 is coupled to a switch connection of the set of switch connections 252 of the main switch 202. In various implementations, data line 216e may comprise communication data lines. The HPD signal may then be transported through circuit connection 268, through data line 220 to display source 210. Upon receiving the initiation signal 244, digital logic 204 may be programmed to determine additional information about the connected device and configure the main switch 202 in a manner that supports the capabilities of the connected device.

In various embodiments, in order to determine additional information, digital logic 204 may perform a handshake using multipurpose switch 206 which may comprise at least one multiplexer 208. As discussed previously, based on a mode of operation, multipurpose switch 206 may couple the set of switch connections 256 to either the first portion of the third set of switch connections 254 or the second portion of the third set of switch connections 254. Thus, based on the mode of operation of the multipurpose switch 206, data line 222 may be coupled to either digital logic 204 over data line 228 or data host 212 over data line 230. Digital logic 204 may set the mode of operation of the multipurpose switch 206 through control port 264.

Continuing the example where cable 106 has the capability of transporting both USB and DisplayPort data, cable 106 may be configured to transport USB 2.0 data through data line 222 or USB 3.0 or faster USB speeds through data lines 216a-e. In a data mode, the multipurpose switch 206 may couple the set of switch connections 256 to a subset of the set of switch connections 254, such that USB 2.0 data is transported between cable 106 and data host 212. Thus, multipurpose switch 206 may couple data line 222 to data line 230 in the data mode.

In contrast, in a handshake mode, the multipurpose switch 206 may couple the set of switch connections 256 to a different subset of switch connections 254 such that the handshake data is transported between cable 106 and digital logic 204. Thus, in the handshake mode, the multipurpose switch 206 may couple data line 222 to the digital logic 204 through data line 228. In several embodiments, after receiving the initiation signal 244, digital logic 204 may set the multipurpose switch 206 in a handshake mode through control port 264 and control line 234, such that the electrical state of switch control 260 is set to operate multipurpose switch 206 in a handshake mode.

During the handshake, digital logic 204 may determine the capabilities of the device attached through cable 106. Continuing the example where cable 106 has the capability of transporting both USB and DisplayPort data and dock 104 is connected through cable 106, the digital logic 204 may determine whether dock 104 has requested to transport both USB and DisplayPort data as well as the particular type of USB data dock 104 is requesting to transport. In various embodiments, digital logic 204 may also determine whether dock 104 is capable of transporting power through cable 106 or vice versa; whether dock 104 has requested that power be transported through cable 106 to dock 104. In the case of a power request, digital logic 204 may determine a direction of power transfer as well as an amount of voltage to transfer.

Depending on the information gathered during the handshake, the digital logic 204 may set the mode of operation of the main switch 202 through control port 262. Although two control ports 262 and 264 are associated with digital logic 204, in various embodiments control ports 262 and 264 may be the same. Digital logic 204 may set the electrical state of the switch control 258 of main switch 202 that enables a mode of operation of the main switch 202 that is compatible with the data received on data lines 216a-e. For instance, main switch 202 may be configured to couple an appropriate number of data lines 214a-e to the data lines 216a-e that are configured to transport DisplayPort data. Additionally, main switch 202 may be configured to couple data line 224 and 226 to the data lines 216a-e configured to transport USB data. Additionally, as discussed previously, for some configurations, digital logic 204 may also enable a data mode of the multipurpose switch 206 such that USB 2.0 data is transported between cable 106 and data host 212.

In various embodiments, main switch 202 may have multiple enhanced modes of operation that support the transfer of both display data as well as bus data. The various enhanced modes of the main switch 202 may be different based on the number of data lines dedicated to each type of protocol. Main switch 202 may also operate in a default mode that supports the transfer of only a single type of protocol, like USB data only.

The main switch 202 may be configured to operate in the default mode when the device connected through cable 106 does not trigger a handshake. For example, if digital logic 204 receives no indication that a device connected through cable 106 is capable of transporting more than one type of protocol, digital logic 204 may operate main switch 202 in the default mode. This might occur when initiation signal 244 is not present. Additionally, in some embodiments, digital logic 204 may set main switch 202 to operate in the default mode in the event of a handshake failure. In some embodiments, main switch 202 may be set to operate in a default mode unless the electrical state of the switch control 258 is set such that main switch 202 operates in an enhanced mode.

As discussed previously, digital logic 204 may perform power negotiations during a handshake. In some implementations, digital logic 204 may enable power delivery to a device connected by cable 106 through power switch 236. Accordingly, in various embodiments, power switch 236 may be turned on to deliver power at one of various levels of power to a device connected by cable 106. By implementing the ability to detect capabilities of a device connected through cable 106 in a manner discussed above, standard DisplayPort video, USB transport, and power delivery may be transported over a single standard cable without a USB power deliver (PD) controller or modifications to standard DisplayPort circuitry.

Figure 3:
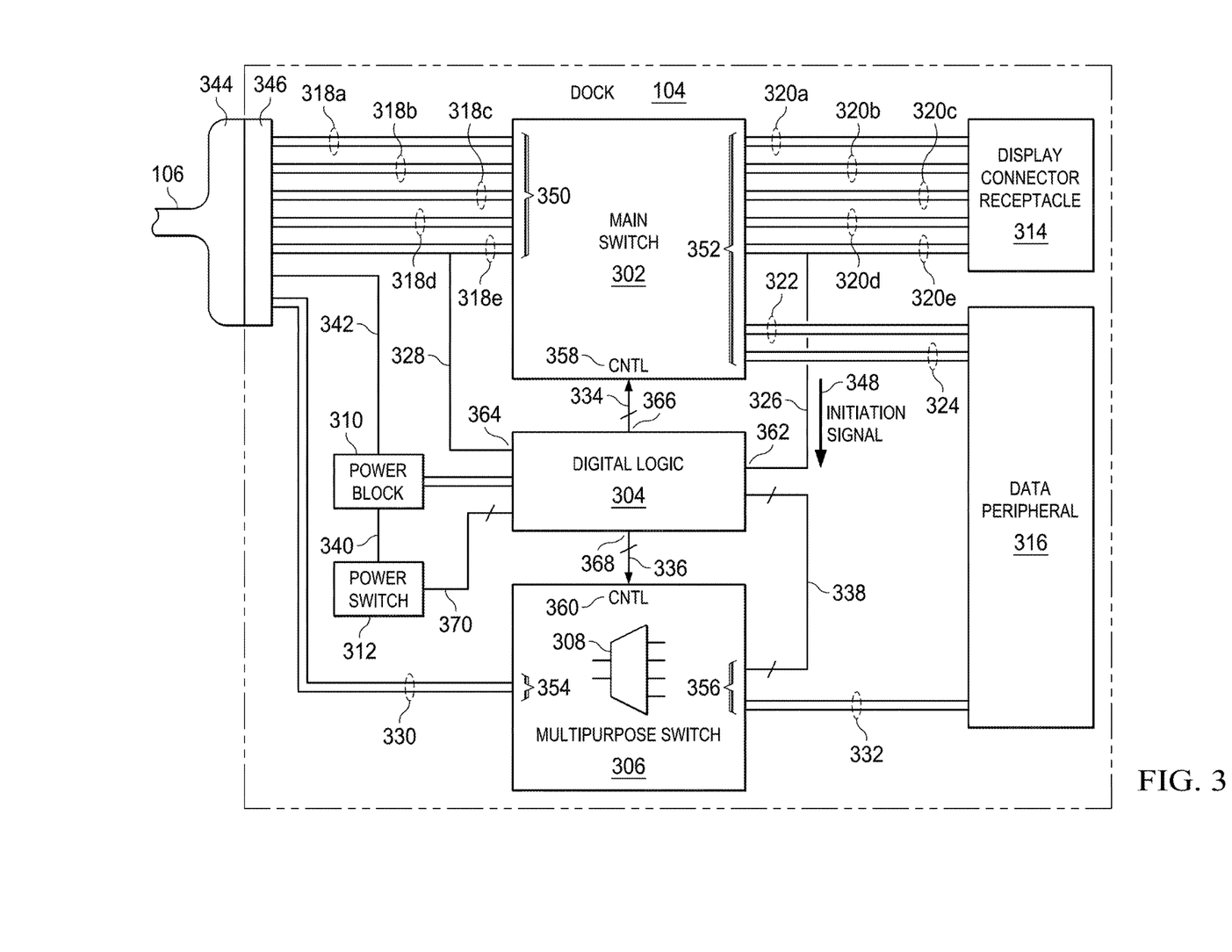
FIG. 3 shows, in block diagram form, various components located within the computing environment in accordance with various examples.

Turning now to FIG. 3, in accordance with several examples, various components located within dock 104 are shown in block diagram form. As depicted, dock 104 is a device capable of simultaneously delivering bus data as well as display data over the cable 106 and optionally enabling power delivery over the cable 106 as well. As depicted, cable 106 is coupled to dock port 346 through connector 344. As discussed with regards to FIGS. 1 and 2, cable 106 couples laptop 102 to dock 104.

Cable 106 is coupled to various components located within dock 104 through data lines 318a-e and 330. Component 302 is a main switch 302 that operates in a manner similar to main switch 202. Main switch 302 may comprise one or more multiplexers. Main switch 302 may be configured to operate in an enhanced mode such that display data and bus data may be received simultaneously or received on the same cable 106 and delivered to a display connector receptacle 314 and data peripheral 316.

In various embodiments, main switch 302 may comprise a set of switch connections 350 coupled to data lines 318a-e. Main switch 302 may also comprise a set of switch connections 352 coupled to data lines 320a-e, 322, and 324. Thus, in various embodiments, a subset of the switch connections 352 is coupled to display connector receptacle 314 (i.e., through data lines 320a-e) and a different subset of the set of switch connections 352 is coupled to the data peripheral 316 (i.e., through data lines 322 and 324). Depending on a mode of operation of the main switch 302, main switch 302 may couple different subsets of the set of switch connections 350 to different subsets of the set of switch connections 352.

For example, main switch 302 may couple display data, such as DisplayPort data, received from one or more data lines 318a-e to one or more data lines 320a-e, such that the display data is delivered to display connector receptacle 314. Thus a subset of switch connections 350 may be coupled to a subset of switch connections 352. In various embodiments, a display connector receptacle may be coupled to a display, such as an external computer monitor or television. Similarly, main switch 302 may couple one or more data lines 318a-e carrying bus data to data lines 322 and 324, such that the bus data may be transported between the data peripheral 316 and cable 106. In various embodiments, data peripheral 316 may be a port coupled to a device communicating to laptop 102 using the bus data transported between the data peripheral 316 and cable 106. In the example of cable 106 transporting DisplayPort and USB data, data peripheral 316 may represent a USB hub. Additionally, cable 106 may transport a slower speed USB standard, such as USB 2.0 using data line 330.

Similar to digital logic 204, digital logic 304 may comprise a reconfigurable system or device that may be updated or programmed by programming code. Digital logic 304 may comprise circuit connections 362 and 364 and control ports 366 and 368. Although two control ports 366 and 368 are depicted, in various embodiments, control ports 366 and 368 may comprise a single output port. Regarding some aspects of operation, digital logic 304 may operate in a manner similar to digital logic 204 as discussed with regards to FIG. 2. In various embodiments, digital logic 304 may detect an initiation signal 348 originating from display connector receptacle 314.

In various embodiments, initiation signal 348 may be transported through data line 326, to circuit connection 362, through digital logic 304 and out circuit connection 364 and data line 328 to data line 318e. In one example, data line 318e may comprise a communication data line. Initiation signal 348 may serve as an indication to the digital logic 304 that a connected device, such as a monitor, may be capable of more than simply communicating using one type of protocol. For example, this may occur when an external monitor with a built in USB hub is connected to display connector receptacle 314.

In other embodiments, the initiation signal 348 may indicate to digital logic 304 that during a handshake, parameters for simultaneous transportation of data across cable 106 may be determined. Additionally, in some embodiments, the presence of an initiation signal 348 may indicate to the digital logic 304 that the main switch 302 should be configured in a manner such that data received from data lines 320a-e, 322, and 324 are multiplexed in a manner such that both the display data and bus data are transported across data lines 318a-e. Main switch 302 may be configured to operate in an enhanced mode of operation such that a subset of the set of switch connections 350 (i.e., a subset of data lines 318a-e) is dedicated to transporting display data and a different subset of the set of switch connections 350 (i.e., a subset of data lines 318a-e) is dedicated to transporting bus data. In various embodiments, the digital logic 304 may set the mode of operation of the main switch 302 by setting the electrical state of the switch control 358 through control port 366 and control line 334.

Digital logic 304 may perform a handshake using data line 330 and multipurpose switch 306. Multipurpose switch 306 may comprise at least one multiplexer. Multipurpose switch 306 may comprise sets of switch connections 354 and 356. As depicted in FIG. 3, in one embodiment, the set of switch connections 354 may be coupled to the cable 106 through data line 330. A first portion of the set of switch connections 356 may be coupled to digital logic 304 through data line 338. Additionally, a second portion of the set of switch connections 356 may be coupled to the data peripheral 316 through data line 332. Based on a mode of operation of the multipurpose switch 306, multipurpose switch 306 may couple the set of switch connections 354 to either the first or second portion of the set of switch connection 356.

Accordingly, in a handshake mode, multipurpose switch 306 may transport handshake data to and from digital logic 304 through data line 338 and to and from cable 106 through data line 330. In a bus mode, multipurpose switch 306 may transport bus data received from cable 106 through data line 330 to data peripheral 316 through data line 332. Thus, depending on a mode of operation of the multipurpose switch, various components may be coupled to data line 330.

In various embodiments, during the handshake, digital logic 304 may communicate with a digital logic in a device connected through cable 106, such as digital logic 204 as discussed with regards to FIG. 2. During the handshake, various parameters may be established related to data transported across cable 106. For example, the parameters may include information about whether dock 104 would like to transport both video and bus data through cable 106, and which data lines 318a-e and 330 will be used for the transportation of video and bus data.

For example, if digital logic 304 determines that a slower USB standard will be used, such as USB 2.0, digital logic 304 may establish the use of data line 330 to transport bus data. In this example, digital logic 304 may configure multipurpose switch 306 to operate in a bus mode by setting the electrical state of the switch control 360 through control port 368 and control line 336. In the bus mode, the multipurpose switch 306 may couple the appropriate subset of the set of switch connections 356 to the set of switch connections 354 such that USB data may be transported to and from data peripheral 316 to cable 106.

Additionally, during the handshake, digital logic 304 may also establish whether dock 104 would like to receive power through cable 106. Digital logic 304 may also establish during the handshake whether the device connected through cable 106 has requested power. Accordingly, during a handshake, the direction of power transfer as well as an amount to transfer may be negotiated and established.

In some embodiments in response to receiving a request for power, digital logic 304 may enable power transfer through power switch block 312. Digital logic may select an amount of voltage to transfer by setting an electrical state of a switch control of power switch 312 through control line 370. In turn power switch 312 may send a signal through data line 340 to power block 310 to enable the selected amount of voltage to be transported through data line 342.

In this manner, a dock 104 comprising digital logic 304 may negotiate the transfer of bus data, display data, and power with laptop 102 comprising digital logic 204, and enable the transfer of multiple protocols and power through a single cable, cable 106. Additionally, depending on a mode of operation of a multipurpose switch 306 data line 330 may be used to perform a handshake or transport bus data.

Figure 4:
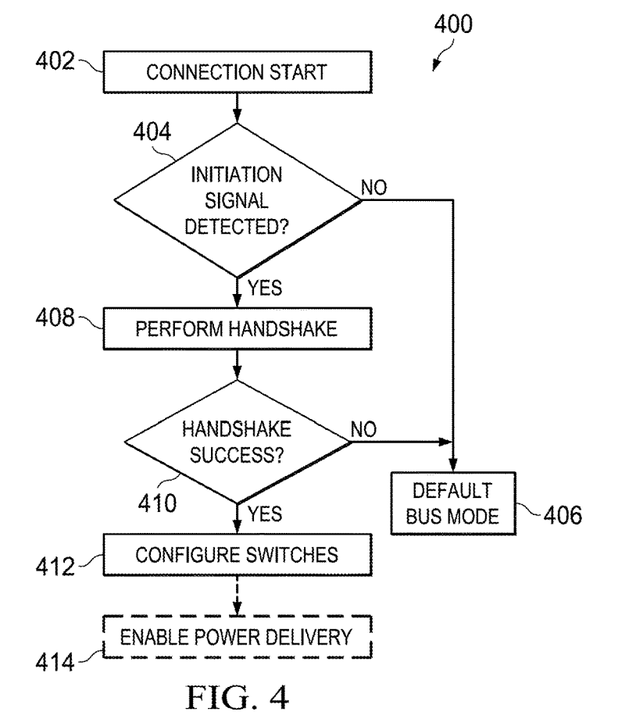
FIG. 4 shows, in block diagram form, a method in accordance with at least some embodiments.

Turning now to FIG. 4, a flow diagram 400 is shown depicting an overall method of negotiating the transfer of data and optionally power across a single cable. Method 400 may be performed by any suitable circuit components in any suitable design, such shown in embodiments of laptop 102 or dock 104 that supports negotiating the transfer of data and optionally power across a single cable in a manner discussed. In various embodiments, some of the blocks shown in FIG. 4 may be performed concurrently, in a different order than shown, or omitted. Additional method elements may be performed as desired.

The method starts at block 402, where a connection starts. In some embodiments, a connection starts when both connectors of the cable are coupled to a device such as a laptop, dock, port expander, television, smart phone, mouse, etc. At decision block 404, a determination is made as to whether an initiation signal is detected. As discussed previously, an initiation signal may be a signal native to a specific type of protocol or it may serve as an indication to a digital logic that a connected device may be capable of more than simply communicating using one type of protocol.

If no initiation signal is detected, flow proceeds to block 406, at which a system may be configured to operate in a default mode. In some embodiments, a system may be configured in such a manner by digital logic setting a main switch in the system to operate in the default mode. As discussed previously, in such a mode, the main switch may be configured to transport bus data only without transporting display data through a cable.

If an initiation signal is detected, flow proceeds to block 408 where a handshake is performed. As discussed previously, the handshake may be performed by a digital logic. In some embodiments, the handshake may be performed over data lines that might be used to transport bus data. Additionally, the handshake data may be transported through a multipurpose switch which may be configured to route the data from the data lines to the digital logic while the multipurpose switch operates in a handshake mode.

Flow 400 proceeds to decision block 410, where a determination is made regarding success of the handshake. If a determination is made that the handshake was not successful, flow proceeds to block 406 at which the main switch is operated in default bus mode. In one example, a handshake may not be successful if digital logic is unable to communicate with another digital logic during the handshake attempt. This might occur in situations where a connected device does not comprise the digital logic as discussed above.

Flow 400 proceeds to block 412, after a determination that a handshake was successful. At block 412, the digital logic may configure switches such as a main switch and multipurpose switch to operate in modes conforming to parameters negotiated during the handshake. This might include the number of data lines dedicated to the transfer of each type of data and protocol or standard.

Flow 400 may additionally proceed to block 414, at which the digital logic may enable power delivery. This may comprise power delivery to or from a connected device. As discussed previously, parameters related to power delivery may be determined during the handshake. Parameters such as direction of power delivery and an amount of voltage to transfer may be determined during the handshake.

Figure 5:
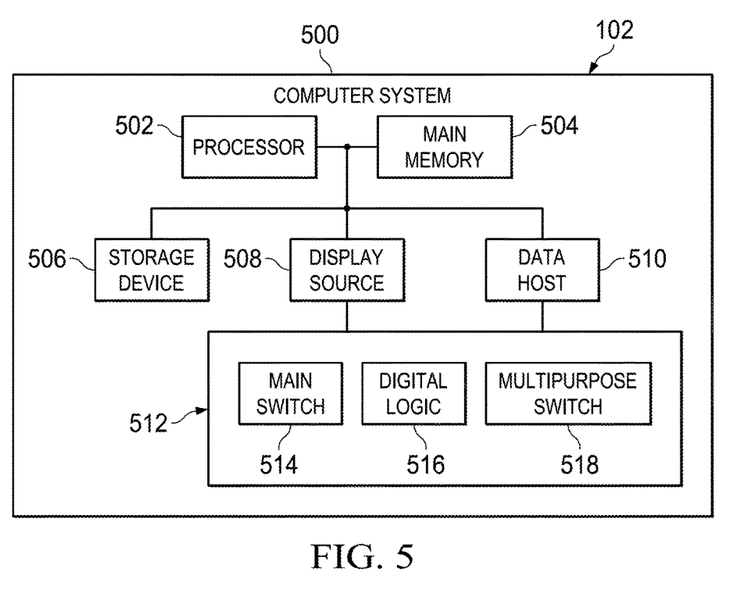
FIG. 5 shows, in block diagram form, a computer system in accordance with at least some embodiments.

FIG. 5 shows a computer system 500 which is illustrative of a computer system within which a main switch, digital logic, and multipurpose switch may operate. The computer system 500 may be illustrative of, for example, laptop 102. In another embodiment, computer 500 may be illustrative of a computing system such as a desktop computer, television, gaming system, or any other computing system that may benefit from being connected to other devices through a cable. The computer system 500 comprises a processor 502, main memory 504 coupled to processor 502. Additionally, processor 502 and main memory 504 may be coupled to storage device 506, display source 508, and data host 510. In turn, block 512 may comprise components such as main switch 514, digital logic 516, and multipurpose switch 518, coupled to display source 508 and data host 510.

Programs executable by the processor 502 may be stored on the storage device 506 (e.g., a hard drive, solid state disk, memory stick, optical disc), and accessed when needed by the processor 502. The program stored on the storage device 506 may comprise programs to implement various processes on the computer system 500. In some cases, the programs are copied from the storage device 506 to the main memory 504, and the programs are executed from the main memory 504. Thus, both the main memory 504 and storage device 506 shall be considered computer-readable storage mediums.

In various embodiments, data host 510 and display source 508 may receive bus data and display data from main switch 514 and multipurpose switch 518. Digital logic 516 may configure modes of operation of main switch 514 and multipurpose switch 518 such that main switch 514 and multipurpose switch 518 operate in a manner compatible with a configuration of a cable coupled to main switch 514 and multipurpose switch 518.

From the description provided herein, those skilled in the art are readily able to combine software with appropriate general-purpose or special-purpose computer hardware to create a computer system and/or computer sub-components in accordance with the various embodiments.

References to "one embodiments," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a main switch configured to:
operate in an enhanced mode in which the main switch is configured to simultaneously transfer data from a first data source and a second data source to a cable;
operate in a default mode in which the main switch is configured to transfer data from the second data source to the cable without transferring data from the first data source;
a multipurpose switch, the multipurpose switch coupled to the cable through a first set of switch connections, the multipurpose switch configured to:
operate in a handshake mode in which the multipurpose switch is configured to transport handshake data between the cable and a digital logic, wherein the handshake data is received on the first set of switch connections;
operate in a data mode in which the multipurpose switch is configured to transport bus data between the cable and the second data source, wherein the bus data is received on the first set of switch connections; and
the digital logic coupled to the multipurpose switch through a first switch control;
the digital logic coupled to the main switch through a second switch control, the digital logic programmed to:
drive the first switch control that enables a mode of operation of the multipurpose switch, the mode of operation of the multipurpose switch comprising one of the handshake mode and the data mode; and
drive the second switch control that enables a mode of operation of the main switch, the mode of operation of the main switch comprising one of the enhanced mode and the default mode.

2. The system of claim 1:
wherein the multipurpose switch further comprises a second set of switch connections, a first subset of the second set of switch connections coupled to the digital logic and a second subset of the second set of switch connections coupled to the second data source;
wherein the multipurpose switch is configured to operate in the handshake mode, the multipurpose switch configured to transport handshake data between the cable and the digital logic through the first set of switch connections and the first subset of the second set of switch connections;
wherein the multipurpose switch is configured to operate in the data mode, the multipurpose switch configured to transport bus data between the cable and the second data source through the first set of switch connections and the second subset of the second set of switch connections.

3. The system of claim 1, wherein the digital logic is programmed to drive the second switch control based on an outcome of a handshake.

4. The system of claim 3 further comprising:
the main switch further comprising a third set and a fourth set of switch connections;
the digital logic further comprising a first and a second circuit connections, and a control port;
wherein the first circuit connection is coupled to a first switch connection of the third set of switch connections, the control port is coupled to the first switch control of the multipurpose switch, the control port further coupled to the second switch control of the main switch; and
wherein the third set of switch connections of the main switch is coupled to the cable, a first subset of the fourth set of switch connections is coupled to the first data source, a second subset of the fourth set of switch connections is coupled to the second data source.

5. The system of claim 4:
wherein the multipurpose switch further comprises a second set of switch connections, a first subset of the second set of switch connections coupled to the digital logic and a second subset of the second set of switch connections coupled to the second data source; and
wherein the digital logic is programmed to drive the second switch control based on an outcome of the handshake, wherein the digital logic is further programmed to:
detect an initiation signal on the first circuit connection;
drive, in response to the detection of the initiation signal, the first switch control such that the multipurpose switch is configured to operate in the handshake mode;
transport handshake data between the cable and the digital logic circuit through the first set of switch connections and the first subset of the second set of switch connections; and
drive the second switch control to enable a mode of operation of the main switch based on the handshake data.

6. The system of claim 1:
wherein the main switch, the digital logic, and the multipurpose switch couple to a dock through the cable; and
wherein the second data source is a universal serial bus (USB) hub.

7. The system of claim 1, wherein the digital logic is programmed to drive the second switch control such that the main switch operates in the default mode, in response to a failed handshake.

8. The system of claim 1:
wherein the multipurpose switch further comprises a second set of switch connections, a first subset of the second set of switch connections coupled to the digital logic and a second subset of the second set of switch connections coupled to the second data source; and
wherein the digital logic is further programmed to:
transmit a request to receive power, the digital logic is configured to transmit the request through the first subset of the second set of switch connections and the first set of switch connections; and
negotiate, based on the request to receive power, an amount of voltage to receive, wherein the cable is configured to transmit the amount of voltage.

9. A system comprising:
a multipurpose switch, the multipurpose switch coupled to a cable through a first set of switch connections, the multipurpose switch configured to:
operate in a handshake mode in which the multipurpose switch is configured to transport handshake data between the cable and a digital logic, wherein the handshake data is received on the first set of switch connections;
operate in a data mode in which the multipurpose switch is configured to transport bus data between the cable and a second data sink, wherein the bus data is received on the first set of switch connections;
a main switch, the main switch configured to operate in an enhanced mode that simultaneously transfers data from the cable to a first data sink and the second data sink; and
the digital logic coupled to the main switch through a control port and a first switch control, the digital logic coupled to the multipurpose switch through the control port and a second switch control, the digital logic programmed to:
drive the first switch control that enables a mode of operation of the multipurpose switch, the mode of operation of the multipurpose switch comprising one of the handshake mode and the data mode; and
drive the second switch control that enables a mode of operation of the main switch.

10. The system of claim 9:
wherein the main switch is further configured to operate in a default mode that transfers data from the cable to the second data sink without transferring data to the first data sink.

11. The system of claim 10:
wherein a first subset of a second set of switch connections of the multipurpose switch couples to the digital logic and a second subset of the second set of switch connections couples to the second data sink;
wherein the multipurpose switch is configured to transport handshake data between the cable and the digital logic through the first set of switch connections and the first subset of the second set of switch connections when in a handshake mode;
wherein the multipurpose switch is configured to transport bus data between the cable and the second data sink through the first set of switch connections and the second subset of the second set of switch connections when in a data mode.

12. They system of claim 10, wherein the digital logic is programmed to drive the second switch control such that the main switch operates in the default mode, in response to a failed handshake.

13. The system of claim 9:
wherein the first data sink comprises a display monitor coupled to the main switch through a display connector receptacle; and
wherein the second data sink comprises a universal serial bus (USB) peripheral.

14. The system of claim 9, wherein the digital logic is further programmed to drive the second switch control based on an outcome of a handshake.

15. The system of claim 9:
wherein the main switch, the digital logic, and the multipurpose switch couple to a dock through the cable.

16. The system of claim 9:
wherein a first subset of the second set of switch connections of the multipurpose switch couples to the digital logic and a second subset of the second set of switch connections couples to the second data sink;
wherein the digital logic is further programmed to drive the second switch control based on an outcome of a handshake, and wherein the digital logic is further programmed to:
  detect an initiation signal on a first circuit connection;
  drive, in response to the detection of the initiation signal, the first switch control such that the multipurpose switch is configured to operate in the handshake mode;
  transport handshake data between the cable and the digital logic circuit through the first set of switch connections and the first subset of the second set of switch connections; and
  wherein the drive the second switch control that enables a mode of operation of the main switch is based on the handshake data.

17. The system of claim 9:
wherein a first subset of the second set of switch connections of the multipurpose switch coupled to the digital logic and a second subset of the second set of switch connections couples to the second data sink; and
wherein the digital logic is further programmed to:
  receive a request to transmit power, wherein the digital logic is configured to receive the request through the first subset of the second set of switch connections and the first set of switch connections; and
  negotiate, based on the request to transmit power, an amount of voltage to transmit, wherein the cable is configured to transmit the amount of voltage.

* * * * *